(12) United States Patent
Ramamurthy et al.

(10) Patent No.: US 8,773,049 B2
(45) Date of Patent: Jul. 8, 2014

(54) SYSTEM FOR USE IN CONTROLLING MOTOR TORQUE AND METHOD OF ASSEMBLING SAME

(75) Inventors: Shyam Sunder Ramamurthy, Louisville, KY (US); Richard Francis Whalen, Jr., Prospect, KY (US); Cecilia Maria Thomas, Shepherdsville, KY (US); Alistair Joseph Booth, Fort Mill, SC (US)

(73) Assignee: General Electric Company, Schenectady, NY (US)

( * ) Notice: Subject to any disclaimer, the term of this patent is extended or adjusted under 35 U.S.C. 154(b) by 460 days.

(21) Appl. No.: 13/182,098

(22) Filed: Jul. 13, 2011

(65) Prior Publication Data

US 2013/0015800 A1 Jan. 17, 2013

(51) Int. Cl.
*H02P 1/00* (2006.01)
(52) U.S. Cl.
USPC ............................................. 318/139; 318/805
(58) Field of Classification Search
USPC ........................... 318/139, 798–801, 805, 812
See application file for complete search history.

(56) References Cited

U.S. PATENT DOCUMENTS

| | | | |
|---|---|---|---|
| 5,414,339 A | 5/1995 | Masaki et al. | |
| 6,339,310 B1 * | 1/2002 | Sugiyama et al. | 318/783 |
| 7,071,642 B2 * | 7/2006 | Wilton et al. | 318/268 |
| 7,122,979 B2 | 10/2006 | Wilton et al. | |
| 7,222,014 B2 | 5/2007 | Tao et al. | |
| 7,459,874 B2 | 12/2008 | Bae et al. | |
| 7,586,286 B2 * | 9/2009 | Cheng et al. | 318/807 |
| 2003/0130772 A1 | 7/2003 | Yanagida et al. | |
| 2009/0212626 A1 * | 8/2009 | Snyder et al. | 307/10.1 |
| 2011/0004364 A1 | 1/2011 | Sawada et al. | |

* cited by examiner

*Primary Examiner* — Rina Duda
(74) *Attorney, Agent, or Firm* — Armstrong Teasdale LLP

(57) ABSTRACT

A method of assembling an electric drive system includes providing a power conversion assembly and coupling an electric power source and a motor to the power conversion assembly. The method also includes coupling a computing device that includes a processor and a memory device operatively coupled to the processor to the power conversion assembly. The method further includes configuring the computing device to record at least one measurement related to a speed of the motor. The method also includes configuring the computing device to calculate a power output limit of the power conversion assembly and limit the power output of the power conversion assembly by limiting torque induced by the motor as a function of the speed of the motor.

20 Claims, 4 Drawing Sheets

SYSTEM FOR USE IN CONTROLLING MOTOR TORQUE AND METHOD OF ASSEMBLING SAME

BACKGROUND OF THE INVENTION

The subject matter disclosed herein relates generally to motors and, more specifically, to systems for use in controlling the output torque of electric motors and methods of assembling such systems.

At least some known electric vehicles include a battery-type power supply, a power converter coupled to the battery, an electric drive motor coupled to the power converter, and a load coupled to the motor via a drive shaft. These known electric vehicles also include a control system that facilitates operation of the power converter to transform the direct current (DC) supplied by the battery to alternating current (AC) having a variable frequency and a variable amplitude for transmission to the motor. The power converter causes the motor to induce a torque to the load, which also determines the electric power transmitted to the motor from the converter.

At least some of these known electric vehicle control systems use a limit on the output torque to limit the DC power transmission from the battery merely as a function of the remaining strength of the battery. Limiting the power draw from the battery is accomplished by limiting the torque output of the motor, thereby limiting motor power. One method of measuring the remaining strength of the battery includes measuring the actual terminal voltage of the battery. Therefore, traditionally, power limiting is accomplished by derating the converter output torque while operating under a reduced battery strength. Torque limiting also facilitates directly reducing current when thermal limits are being approached.

In at least some of these known electric vehicle control systems, such torque limiting unnecessarily limits performance when the derating is due to limited power availability. Such control scheme typically limits motor torque to induce a most restrictive drive shaft speed and unnecessarily limits the amount of torque available for braking or driving the load at low speeds. Moreover, rapid fluctuations of the battery terminal voltage during normal operation may induce similar fluctuations of the motor torque, thereby facilitating transient torque changes and drive shaft vibration.

BRIEF DESCRIPTION OF THE INVENTION

In one aspect, a method of assembling an electric drive system is provided. The method includes providing a power conversion assembly and coupling an electric power source and a motor to the power conversion assembly. The method also includes coupling a computing device that includes a processor and a memory device operatively coupled to the processor to the power conversion assembly. The method further includes configuring the computing device to record at least one measurement related to a speed of the motor. The method also includes configuring the computing device to calculate a power output limit of the power conversion assembly and limit the power output of the power conversion assembly by limiting torque induced by the motor as a function of the speed of the motor.

In another aspect, a motor control system for an electric drive system is provided. The electric drive system includes a motor operatively coupled to a power conversion assembly and to an electric power source. The motor control system includes a memory device configured to store a plurality of operational measurements of at least one of the electric power source, the power conversion assembly, and the motor. Each operational measurement is associated with power transfer from the electric power source to the motor via the power conversion assembly. The motor control system also includes a processor operatively coupled in communication with the memory device. The processor is programmed to calculate a power output limit of the power conversion assembly, and limit the power output of the power conversion assembly by limiting torque induced by the motor as a function of the speed of the motor.

In yet another aspect, an electric drive system is provided. The electric drive system includes a power conversion assembly and an electric power source and a motor coupled to the power conversion assembly. The electric drive system includes also a computing device including a processor and a memory device operatively coupled to the processor. The computing device is coupled to the power conversion assembly. The computing device is configured to record at least one measurement related to a speed of the motor. The computing device is also configured to calculate a power output limit of the power conversion assembly. The computing device is further configured to limit the power output of the power conversion assembly by limiting torque induced by the motor as a function of the speed of the motor.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
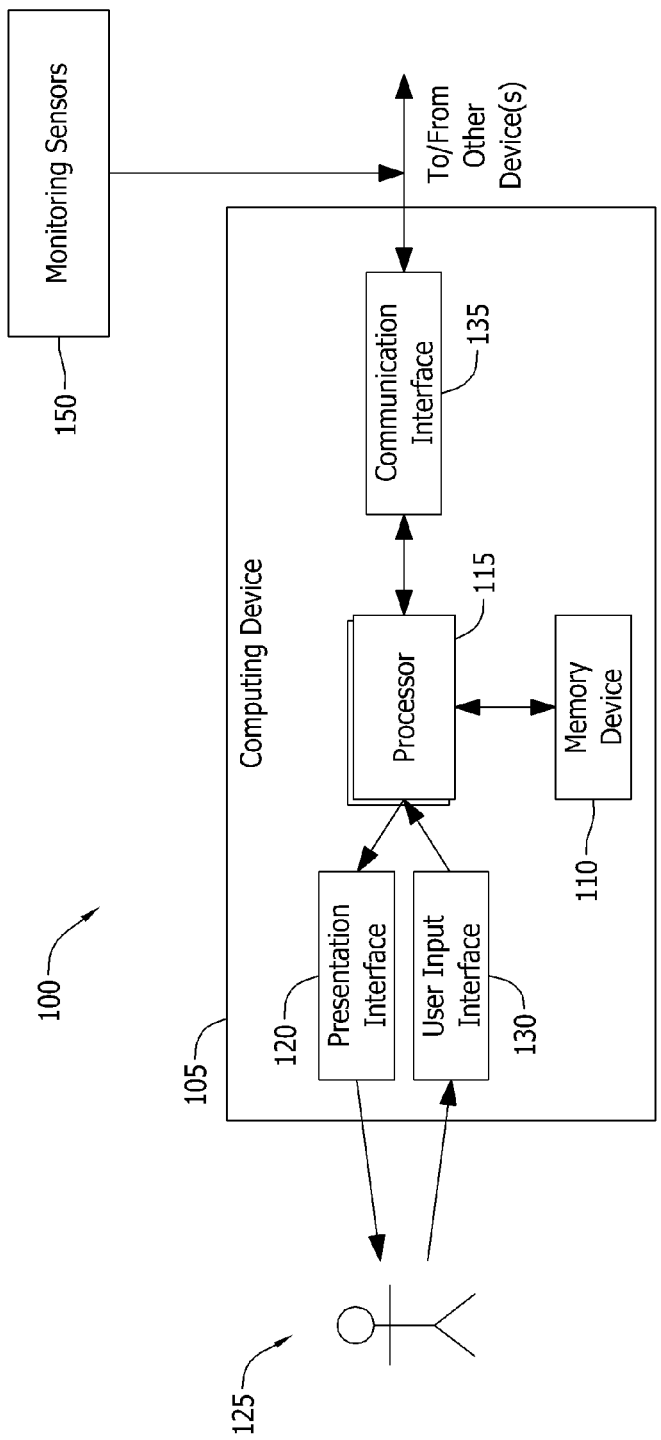
FIG. 1 is a block diagram of an exemplary motor control system that may be used to monitor and/or control the operation of an electric vehicle.

FIG. 1 is a block diagram of an exemplary motor control system 100 that may be used to monitor and/or control the operation of an electric vehicle (not shown in FIG. 1). Motor control system 100 includes an exemplary computing device 105. Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

In the exemplary embodiment, memory device 110 is one or more devices that enables storage and retrieval of information such as executable instructions and/or other data. Memory device 110 may include one or more computer readable media, such as, without limitation, dynamic random access memory (DRAM), static random access memory (SRAM), a solid state disk, and/or a hard disk. Memory device 110 may be configured to store operational measurements including, without limitation, vibration readings, field voltage and current readings, field reference setpoints, stator voltage and current readings, rotor speed readings, maintenance tasks, and/or any other type of data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval.

In some embodiments, computing device 105 includes a presentation interface 120 coupled to processor 115. Presentation interface 120 presents information, such as a user interface and/or an alarm, to a user 125. For example, presentation interface 120 may include a display adapter (not shown) that may be coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 may include an audio output device (not shown) (e.g., an audio adapter and/or a speaker). In some embodiments, presentation interface 120 presents an alarm associated with a drive train (not shown in FIG. 1) of the electric vehicle, such as by using a human machine interface (HMI) (not shown).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, and/or a touch sensitive panel (e.g., a touch pad or a touch screen). A single component, such as a touch screen, may function as both a display device of presentation interface 120 and user input interface 130.

A communication interface 135 is coupled to processor 115 and is configured to be coupled in communication with one or more other devices, such as a plurality of monitoring sensors 150 or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
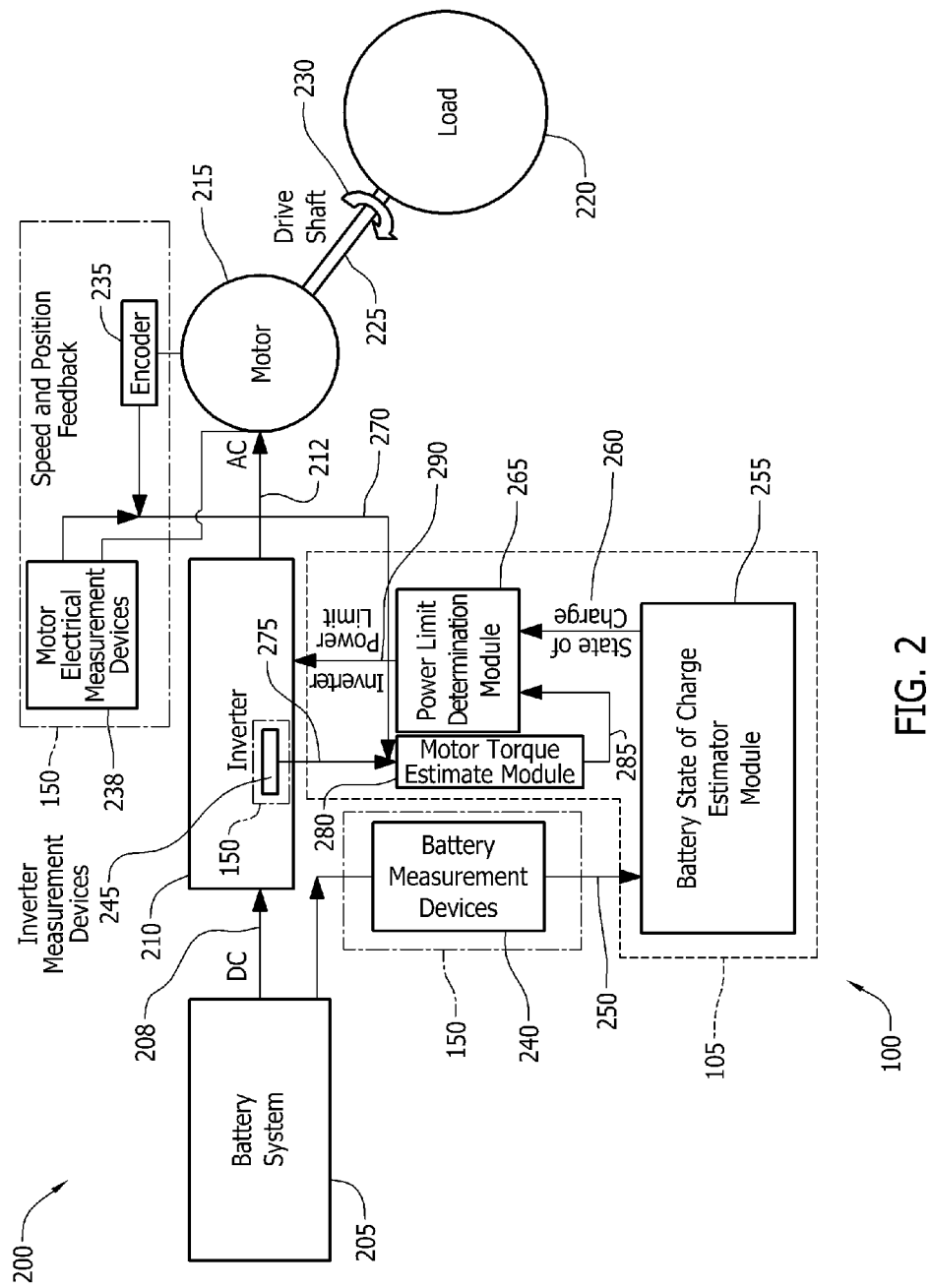
FIG. 2 is a block diagram of an exemplary electric drive system for an electric vehicle that may be used with the motor control system shown in FIG. 1.

FIG. 2 is a block diagram of an exemplary electric drive system 200 for an electric vehicle (not shown) that may be used with motor control system 100. In the exemplary embodiment, system 200 includes an electric power source, e.g., a battery system 205. Battery system 205 may be a single, stand-alone battery, or may include a plurality of batteries operatively coupled to enable electric drive system 200 to operate as described herein. Alternatively, battery system 205 may be replaced with any mobile electric power source that enables operation of electric drive system 200 as described herein including, without limitation, combustion-type devices and fuel cells. Moreover, for those embodiments of electric drive system 200 that are embedded within apparatus and/or systems that do not require or provide mobility, battery system 205 may be replaced with stationary electric power sources that include, without limitation, utility-provided line power and auxiliary generators. In the exemplary embodiment, battery system 205 includes at least one rechargeable battery that stores and transmits direct current (DC) electric power 208.

Also, in the exemplary embodiment, system 200 includes a power conversion assembly, e.g., an inverter 210. Inverter 210 is coupled to battery system 205 and converts DC power 208 supplied by battery system 205 to alternating current (AC) power 212 having a variable frequency and a variable amplitude. In the exemplary embodiment, inverter 210 is a variable frequency drive (VFD) that includes a plurality of semiconductor switches (not shown) including, without limitation, transistors.

Further, in the exemplary embodiment, system 200 includes an electric drive motor 215 coupled to inverter 210. Motor 215 is any AC motor that enables operation of electric drive system 200 as described herein. Motor 215 is coupled to a load 220 via a drive shaft 225. In the exemplary embodiment, load 220 is a transmission. Alternatively, load 220 is any device that enables operation of system 200 as described herein. Motor 215 induces a torque 230 on drive shaft 225 to drive load 220.

Monitoring sensors 150 include a motor speed and position feedback encoder 235. Encoder 235 is communicatively coupled to computing device 105. Monitoring sensors 150 also include a plurality of motor electrical measurement devices 238 communicatively coupled to computing device 105. Devices 238 include, without limitation, current transducers to measure winding currents within motor 215. Monitoring sensors 150 further include battery measurement devices 240. Devices 240 include, without limitation, at least one sensor (not shown) to measure a terminal voltage of battery system 205, a current capacity rating of electric drive system 200, and an overall impedance of electric drive system 200. Monitoring sensors 150 also include a plurality of inverter measurement devices 245 that facilitate monitoring inverter 210 and estimating AC power 212 transmitted from inverter 210. Such devices 245 include, without limitation, at least one sensor to measure temperatures of inverter 210, and at least one feedback mechanism to record a firing rate of firing devices (not shown) in inverter 210. For embodiments of electric drive system 200 that include power sources such as line sources, such plurality of inverter measurement devices 245 include, without limitation, at least one sensor (none shown) to measure the number of input line phases available to inverter 210 and the overall impedance of the system 200.

Computing device 105 receives battery measurement signals 250 from battery measurement devices 240 and transmits those signals to a battery state of charge estimator module 255. Battery measurement signals 250 include, without limitation, values representative of a terminal voltage of battery system 205, a current capacity rating of electric drive system 200, and an overall impedance of electric drive system 200. Charge estimator module 255 uses programmed computing instructions, that may include at least one algorithm, to determine an approximation of the remaining capacity of battery system 205. Charge estimator module 255 also transmits a state of charge signal 260 to a power limit determination module 265, wherein state of charge signal 260 is representative of the remaining capacity of battery system 205.

Computing device 105 also receives motor feedback signals 270 that include speed and position feedback signals transmitted from encoder 235 and winding current signals from motor electrical measurement devices 238. Computing device 105 further receives inverter measurement signals 275 transmitted from inverter measurement devices 245. Inverter measurement signals 275 may include, without limitation, estimated values indicative of terminal voltages of motor 215. Alternatively, motor electrical measurement devices 238 may include motor terminal voltage transducers and computing device 105 may use actual motor terminal voltage values. A motor torque estimate module 280 receives motor feedback signals 270 and inverter measurement signals 275. Motor torque estimate module 280 uses programmed computing instructions, that may include at least one algorithm, to determine an approximation of AC power 212 as a function of estimated and/or actual terminal voltages and measured winding currents of motor 215. Motor torque estimate module 280 uses programmed computing instructions, that may include at least one algorithm, to also determine torque 230 being generated by motor 215, and transmits a motor torque estimate signal 285 to power limit determination module 265. Power limit determination module 265 uses programmed computing instructions, that may include at least one algorithm, to determine an inverter power limit signal 290 to be transmitted to inverter 210. Inverter power limit signal 290 is representative of a commanded inverter power limit as a function of the current state of charge of battery system 205 and actual speed of drive shaft 225.

The exemplary use of electric drive system 200 is directed towards an electric vehicle. However, electric drive system 200 may be used with any apparatus and/or system that includes a power supply, a power converter, a drive motor, and a load.

Figure 3:
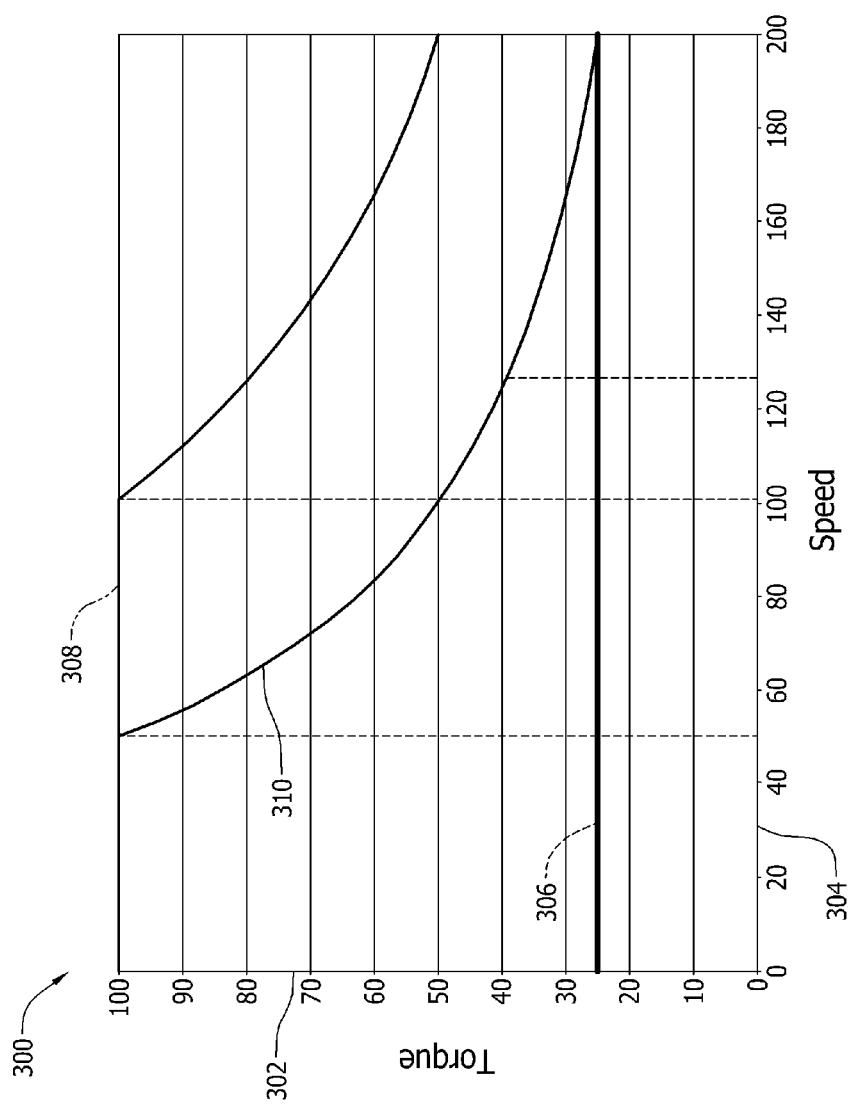
FIG. 3 is a graphical representation of comparative motor torque versus motor speed relationships for systems using and not using the electric drive system shown in FIG. 2.

FIG. 3 is a graphical representation 300 of comparative motor torque versus motor speed relationships for systems using and not using electric drive system 200 (shown in FIG. 2). Graph 300 includes a y-axis 302 representing available torque 230 (shown in FIG. 2) capability measured in units of percent (%) and in increments of 10% (0.1) extending from 0 to 100%. Graph 300 also includes an x-axis 304 representing the speed of motor 215 (shown in FIG.2) normalized to rated motor speed (100%) and measured in units of % and in increments of 20% (0.2) extending from 0 to 2, i.e., 0% to 200% of rated speed.

Graph 300 further includes a horizontal line 306 positioned to intersect with the value 25% on y-axis 302. Line 306 represents 25% of the rated torque capacity of motor 215, which is the torque limit allowed for electric drive systems other than electric drive system 200 as described herein, when trying to limit the power output to 50%. Without electric drive system 200 as described herein, another electric drive system may not have sufficient torque available to generate a velocity of drive shaft 225 (shown in FIG. 2) to effectively drive load 220 (shown in FIG. 2) when the load exceeds the 25% torque capability limit.

Graph 300 includes a first curve 308 that represents a torque versus speed capability for an electric drive system when full designed capability is available. The system shown in curve 308 includes a 100% torque capability limit applied regardless of motor speed between 0% and 100% of rated speed and a power limiting determined by system design selection of motor rated speed and torque-speed curve. Therefore, from 0% to 100% of rated speed, the available torque capacity limit is 100% of rated torque, and curve 308 shows that the vehicle runs with 100% of the associated torque rating of motor 215 available to be used until 100% of the speed rating of motor 215 is attained. Curve 308 also shows the available capacity of torque 230 decreasing as a function of increasing speed above a value of 100%. 200% is the top speed available to be attained by motor 215 with approximately 50% of the torque capability available. The rapid derating of available torque capability from 100% of rated capacity to 50% of rated capacity as speed increases from 100% of rated speed to 200% of rated speed is required at least partially due to the design power capacity limits of battery system 205. Curve 308 remains the same for an electric drive system irrespective of whether it includes motor control system 100 (shown in FIGS. 1 and 2) or not. An electric drive system with motor control system 100 will apply a 100% torque limit when the full designed power capacity is available and hence, torque-speed curve 308 will remain unchanged.

Graph 300 also includes a second curve 310 that represents a torque versus speed capability for electric drive system 200 including motor control system 100 as described herein, when available power capacity has reduced. In the exemplary embodiment, motor control system 100 decreases a capability of torque 230 available to be induced by motor 215 for limiting the power output of inverter 210 (shown in FIG. 2). When available power capacity is only 50% of peak designed value, available torque 230 starts to decrease from 100% of rated torque at 40% of rated speed of motor 215, and at 100% of rated speed, available torque 230 decreases to 50% of rated torque. As speed increases beyond 100% of rated, available torque 230 continues to decrease and when 200% of rated speed is attained, the value of available torque of 25% is also attained. In contrast to the system represented by curve 306, electric drive system 200 generates sufficient torque to continue to maintain or increase velocity to effectively drive load 220 even when power output has to be limited due to reduced power available, thereby reducing power below that available from battery system 205 (shown in FIG. 2).

During operation, in the exemplary embodiment, the battery voltage of battery system 205 (shown in FIG. 2) decreases slowly as electric drive system 200 continuously operates. Also, in the exemplary embodiment, the input power to motor 215 from inverter 210 (shown in FIG. 2) decreases slowly as electric drive system 200 continuously operates. Further, in the exemplary embodiment, the motor torque limit at low speeds is substantially constant as electric drive system 200 continuously operates.

Specifically, in the exemplary embodiment, during operation, motor torque at low speeds is substantially constant while power input to motor 215 from inverter 210 decreases as battery voltage strength decreases. Limiting the power input from power conversion assembly, or inverter 210 rather than torque output of motor 205 facilitates sufficient torque being available at lower speeds for motoring as well as braking, thereby facilitating an ability of electric drive system 200 to accelerate and brake even when source, or battery strength is reduced. Electric drive system 200 uses a motor output power limit as a function of the source, or battery strength and computes the torque limit to apply based on the present motor shaft velocity. For example, a battery operated vehicle can still climb steep grades at a reduced speed when battery system 205 has almost completely discharged.

Further, during operation, the capacity of battery system 205 decreases slowly and steadily during normal operation of electric drive system 200, thereby reducing rapid fluctuations of the battery terminal voltage. Moreover, by controlling the torque of motor 215 as a function of the speed of motor 215, any fluctuations of motor 215 as a result of fluctuations of battery system 205, and the associated rapid transient torque changes and drive shaft vibrations, are reduced.

Figure 4:
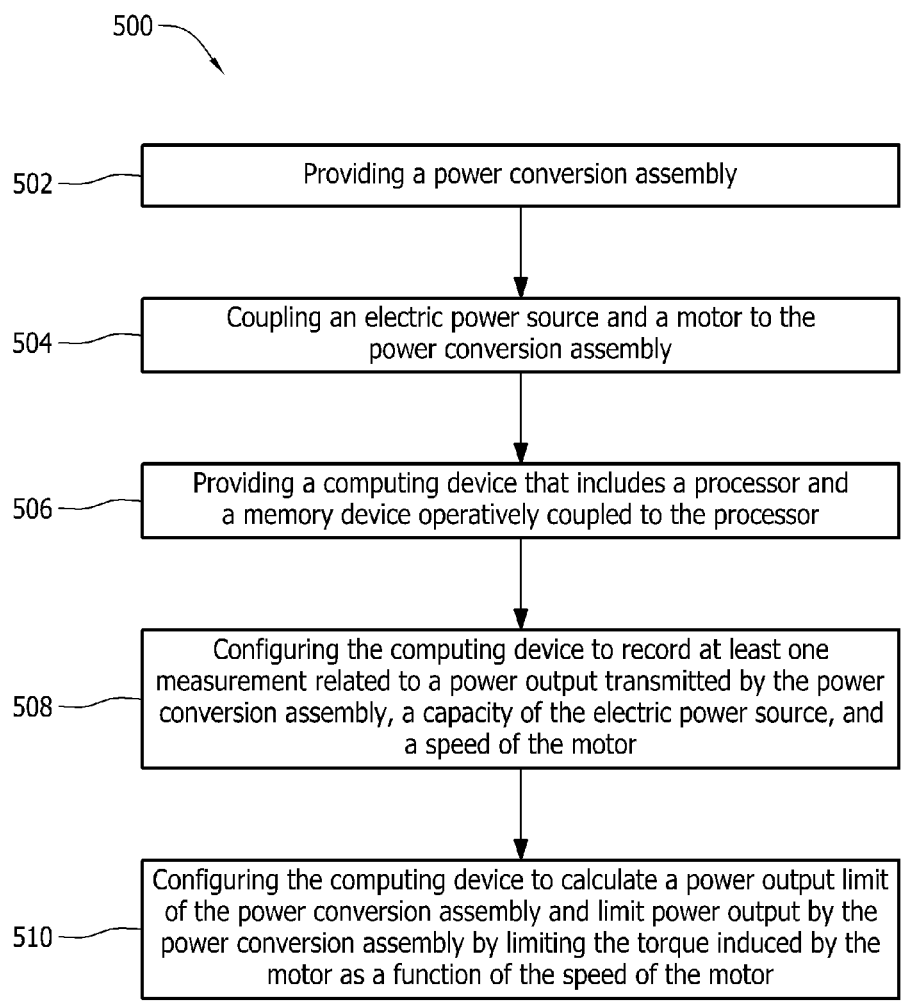
FIG. 4 is a flow chart illustrating an exemplary method of assembling the electric drive system shown in FIG. 2.

FIG. 4 is a flow chart illustrating an exemplary method 500 of assembling the electric drive system shown in FIG. 2. In the exemplary embodiment, a power conversion assembly, e.g., inverter 210 (shown in FIG. 2) is provided. An electric power source, e.g., battery system 205, and a motor 215 (both shown in FIG. 2) are coupled to inverter 210. Computing device 105 that includes processor 115 and memory device 110 (all shown in FIG. 1) operatively coupled to processor 115 is provided 506. Computing device 105 is configured 508 to record at least one measurement related to a power output transmitted by inverter 210, a capacity of battery system 205, and a speed of motor 215. Computing device 105 is also configured 510 to calculate a power output limit of inverter 210 and limit a power output of inverter 210 by limiting the torque induced by motor 215 as a function of the speed of motor 215.

In contrast to known electric drive systems, the systems and assembly methods as described herein provide enhanced torque control and power management of electric drive systems. Specifically, in contrast to known electric drive systems, the systems and assembly methods as described herein facilitate controlling the input power of a drive motor by limiting the output power as a function of drive motor speed. Therefore, the motor speed is the primary torque-limiting parameter. Moreover, in contrast to known electric drive systems, the systems and assembly methods as described herein facilitates using a remaining capacity of the primary power source as a secondary torque-limiting parameters instead of the primary torque-limiting parameter. Further, in contrast to known electric drive systems, the systems and assembly methods as described herein facilitate maintaining the motor torque limit substantially constant while decreasing motor power output as battery voltage decreases, and capability to drive the load is maintained.

Embodiments of computer-based control as provided herein facilitate providing enhanced torque control and power management of electric drive systems. Specifically, such enhanced control of motor torque facilitates maintaining the motor torque limit substantially constant while decreasing power input to a motor from a power converter assembly as a function of motor speed and battery capacity. More specifically, the primary control variable is the motor speed and the secondary control variable is the battery capacity. Limiting the power output from a power converter assembly rather than directly limiting the torque output of the motor facilitates sufficient torque being available at lower speeds for motoring as well as braking of an electric vehicle, thereby facilitating an ability of an electric drive system to accelerate and brake even when the battery strength is reduced. For example, since computer-based control as provided herein uses a motor output power limit as a function of the battery strength and computes the torque limit to apply based on the present motor shaft velocity, a battery operated vehicle can still climb steep grades at a reduced speed even when the battery system is almost completely discharged. Further, the computer-based control as provided herein facilitates the capacity of the battery system to decrease slowly and steadily during normal operation of the electric drive system, thereby reducing rapid fluctuations of the battery terminal voltage. Moreover, the computer-based control as provided herein facilitates controlling the output torque of the motor as a function of the speed of the motor. Therefore, any fluctuations of the motor as a result of fluctuations of the battery system are reduced, and the associated rapid transient torque changes and drive shaft vibrations, are reduced as well.

An exemplary technical effect of the systems and assembly methods described herein includes at least one of (a) limiting a power output by a converter by limiting the torque induced by the motor as a function of a calculated power output limit of the power conversion assembly; (b) calculating the power output limit of the power conversion assembly as a function of a power output transmitted by the power conversion assembly, a capacity of the electric power source, and a speed of the motor; (c) calculating the capacity of the electric power source by measuring battery terminal voltage, a current capacity rating of the electric drive system, and an impedance of the electric drive system; (d) estimating a torque output induced by the motor as a function of the power output transmitted by the power conversion assembly and the speed of the motor; and (e) transmitting an inverter power limit signal from a computing device to the power conversion assembly to command the power conversion assembly to limit transmission of electric power from the power conversion assembly to the motor to facilitate maintaining a predetermined motor speed.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A method for controlling an electric drive system, said method comprising:
   providing a power conversion assembly;
   coupling an electric power source and a motor to the power conversion assembly;

coupling a computing device that includes a processor and a memory device operatively coupled to the processor to the power conversion assembly; and configuring the computing device to:
record at least one measurement related to a speed of the motor;
determine a motor torque limit as a function of the speed of the motor; and
limit a power output of the power conversion assembly as a function of the torque limit.

2. A method in accordance with claim 1 further comprising configuring the computing device to record at least one measurement related to:
a power output transmitted by the power conversion assembly; and
a capacity of the electric power source.

3. A method in accordance with claim 2, wherein configuring the computing device to record at least one measurement comprises configuring the computing device to record values representative of at least one of a battery terminal voltage, a current capacity rating of the electric drive system, and an impedance of the electric drive system.

4. A method in accordance with claim 1, wherein coupling an electric power source and a motor to the power conversion assembly comprises coupling a direct current (DC) battery system and an alternating current (AC) motor to an inverter.

5. A method in accordance with claim 1, wherein configuring the computing device to calculate a power output limit comprises configuring the computing device to estimate a power output of the power conversion assembly as a function of estimated motor terminal voltages and measured winding currents.

6. A method in accordance with claim 1, wherein configuring the computing device to limit a power output comprises configuring the computing device to transmit an inverter power limit signal from the computing device to the power conversion assembly.

7. A method in accordance with claim 6, wherein configuring the computing device to limit the power output further comprises configuring the computing device to limit transmission of electric power from the power conversion assembly to the motor.

8. A method in accordance with claim 7, wherein configuring the computing device to limit transmission of electric power comprises configuring the computing device to facilitate transmission of electric power from the power conversion assembly to the motor to facilitate maintaining a predetermined motor speed.

9. A motor control system for an electric drive system that includes a motor operatively coupled to a power conversion assembly and to an electric power source, said system comprising:
a memory device configured to store a plurality of operational measurements of at least one of the electric power source, the power conversion assembly, and the motor, wherein each operational measurement is associated with power transfer from the electric power source to the motor via the power conversion assembly; and
a processor coupled in communication with said memory device, said processor programmed to:
determine a motor torque limit as a function of the speed of the motor; and
limit power output of the power converter by limiting the torque induced by the motor as a function of the torque limit.

10. A motor control system according to claim 9, wherein said processor is programmed to receive at least one measurement related to:
a power output transmitted by the power conversion assembly;
a capacity of the electric power source; and
a speed of the motor.

11. A motor control system according to claim 10, wherein said processor is further programmed to receive measurements representative of at least one of a battery terminal voltage, a current capacity rating of the electric drive system, and an impedance of the electric drive system.

12. A motor control system according to claim 9, wherein said processor is further programmed to estimate a power output of the power conversion assembly as a function of estimated motor terminal voltages and measured winding currents.

13. A motor control system according to claim 9, wherein said processor is further programmed to transmit an inverter power limit signal to the power conversion assembly.

14. A motor control system according to claim 9, wherein said processor is further programmed to:
record at least one measurement related to:
a power output transmitted by the power conversion assembly; and
a capacity of the electric power source;
limit a torque induced by the motor by limiting the power output of the power conversion assembly as a function of a speed of the motor; and
limit transmission of electric power from the power conversion assembly to the motor.

15. An electric drive system comprising:
a power conversion assembly;
an electric power source and a motor coupled to said power conversion assembly;
a computing device comprising a processor and a memory device operatively coupled to said processor, said computing device operatively coupled to said power conversion assembly and configured to:
record at least one measurement related to a speed of said motor;
determine a motor torque limit as a function of the speed of the motor; and
limit a power output by said power converter as a function of the torque limit.

16. An electric drive system in accordance with claim 15, wherein:
said power conversion assembly comprises an inverter;
said electric power source comprises a direct current (DC) battery system; and
said motor comprises an alternating current (AC) motor.

17. An electric drive system in accordance with claim 16, wherein said processor is further configured to receive measurements representative of at least one of a battery terminal voltage, a current capacity rating of the electric drive system, and an impedance of said electric drive system.

18. An electric drive system in accordance with claim 15, wherein said processor is further configured to estimate a power output of said power conversion assembly as a function of estimated motor terminal voltages and measured winding currents.

19. An electric drive system in accordance with claim 15, wherein said processor is further configured to transmit an inverter power limit signal to said power conversion assembly.

20. An electric drive system in accordance with claim 15, wherein said processor is further configured to:

record at least one measurement related to:
   a power output transmitted by said power conversion assembly; and
   a capacity of said electric power source;
limit a torque induced by said motor by limiting the power output of said power conversion assembly as a function of a speed of said motor; and
limit transmission of electric power from said power conversion assembly to said motor.

* * * * *